May 1, 1928.  
F. J. STEFL  
HORSESHOEING STALL  
Filed Aug. 18, 1927

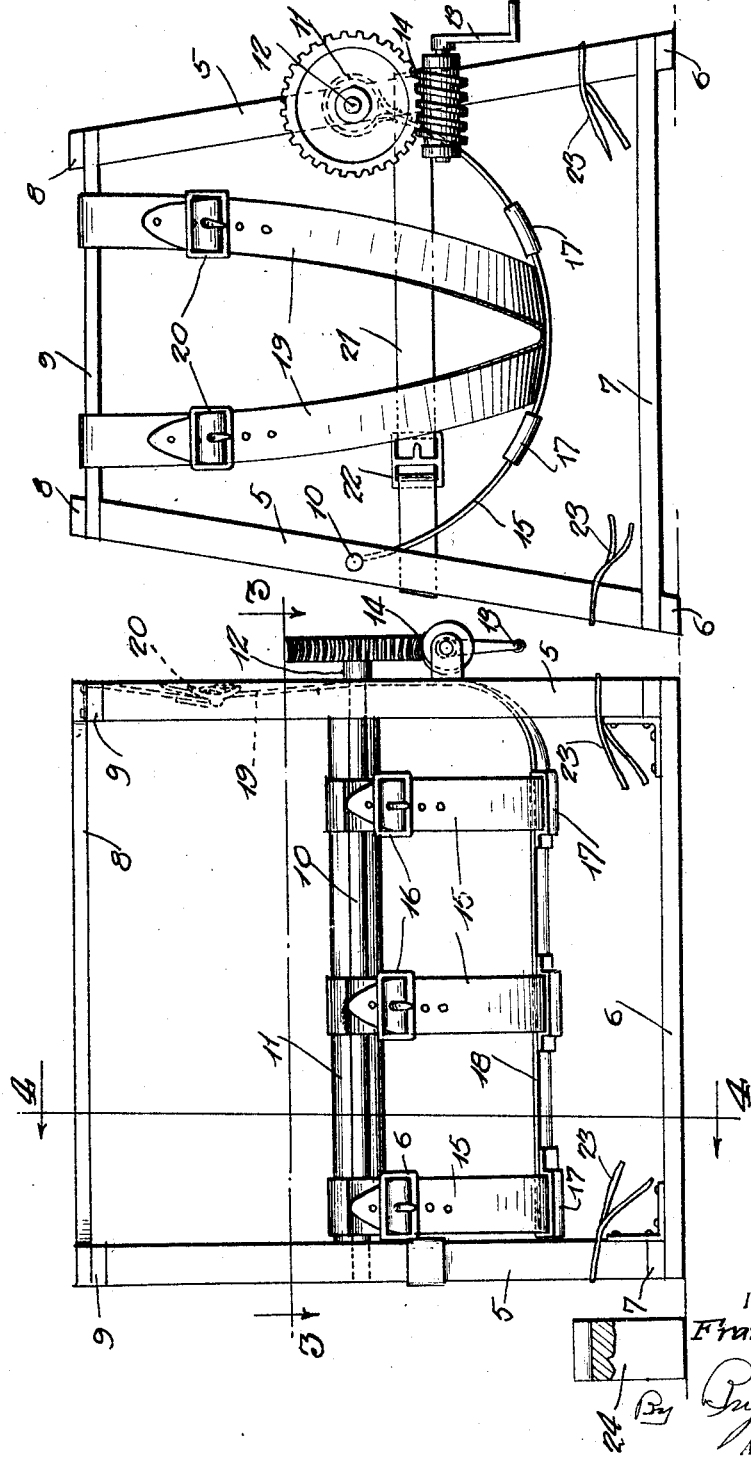

INVENTOR.  
Frank J. Stefl.  
BY  
Bryant H. Lowry  
ATTORNEYS.

Patented May 1, 1928.

1,668,381

UNITED STATES PATENT OFFICE.

FRANK J. STEFL, OF RICE LAKE, WISCONSIN.

HORSESHOEING STALL.

Application filed August 18, 1927. Serial No. 213,924.

This invention relates to improvements in horseshoeing stalls, and has for its primary object to provide a simple and practical apparatus of this kind by means of which a vicious animal may be readily shod, without danger of injury to the shoer.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view of a horseshoeing stall constructed in accordance with the present invention;

Figure 2 is a front end elevational view thereof;

Figure 3:
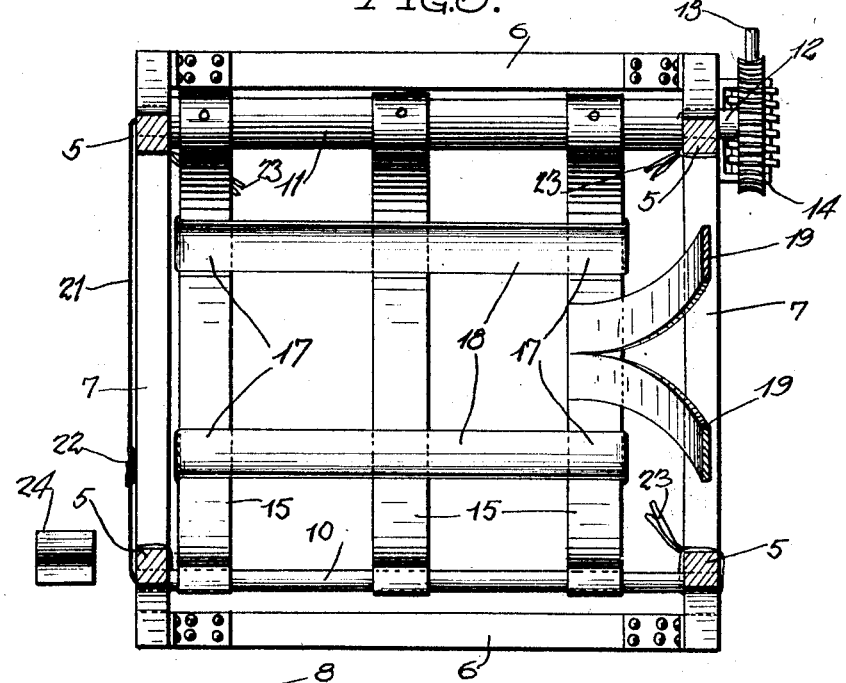
Figure 3 is a horizontal section taken on line 3—3 of Figure 1.
Figure 4:
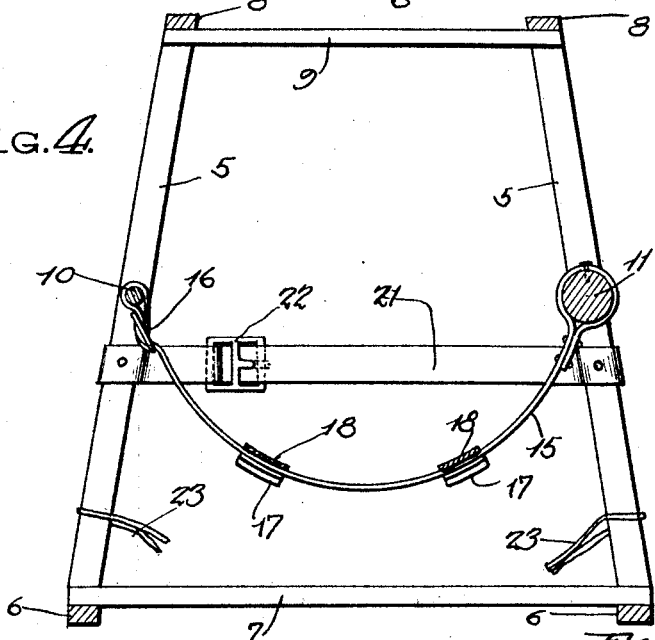
Figure 4 is a vertical transverse section taken upon line 4—4 of Figure 1.

Referring more in detail to the drawing, the present invention consists of a frame embodying corner posts 5 mounted upon side sills 6 and end sills 7 and connected at the top by suitable braces 8 and 9 respectively extending longitudinally and transversely of the frame. Between the posts on one side of the frame is mounted a horizontal bar 10, and between the posts on the other side of the frame is mounted a horizontal roller 11 having a projecting operating shaft 12 at its forward end operatively geared to an operating crank handle 13 by means of a worm gearing generally indicated at 14. To the roller 11 are fastened girth straps 15 which are adapted to be passed under the body of the animal and are provided at their ends with buckle means 16 for detachably connecting the same to the rod 10. Obviously, by rotating the handle 13, the roller 11 may be turned for winding the girth straps 15 thereon and adjusting the latter to the animal, the adjustment being effectively maintained by the self-locking nature of the worm gearing 14. Slidably connected at their ends by loops 17 to the front and rear girth straps 15 are longitudinal straps 17 which are adapted to extend between the legs of the animal and are capable of adjustment toward or away from each other on the girth straps according to the size of the body of the animal to be shod.

Attached at their lower ends to the front girth strap 15 are a pair of head-stock straps 19 which extend upwardly in slightly diverging relation and are anchored at their upper ends to the adjacent front transverse brace 9 and which are preferably formed of separately connected sections connected by the use of buckles 20. It will be understood that the animal's head is adapted to be received between the straps 19 so that the animal may not swing his head to one side or the other to an objectionable extent or to such an extent as to watch the shoeing operation and become frightened. The buckle connections 20 are provided for adjusting the length of the straps 19 in accordance with the adjustment of the girth strap 15, as will be readily apparent. The posts at the rear end of the frame are connected by a breeching strap 21, by means of which the animal is prevented from balking during the shoeing operation, and this breeching strap is preferably composed of separate sections suitably secured to the corner posts and separably connected by means of a buckle 22. Suitable hopples 23 are secured to the lower end portions of the corner posts adapted to be tied about the animal's legs for preventing the animal from kicking during the shoeing operation.

In use, the animal is driven into the stall and secured by the various devices herein described. The straps 19 prevent escape from the front end of the frame and the strap 21 which passes around the buttocks prevents the animal from backing out of the frame. The feet, except the one to be operated on, are secured by the hopples 23. The foot which is to receive the shoe may be placed on top of an ordinary leg rest or stand 24. The apparatus is fastened to the floor by means of the side sills 6.

By the apparatus herein described, the animal will be securely held, and vicious, restless and nervous horses or other animals can be easily and expeditiously shod without danger of injury to the shoer. The various adjustments and changes necessary in using the apparatus may be quickly made, and the apparatus effectively serves the purpose for which it is intended.

What I claim as new is:—

1. In a horseshoeing stall, a frame having corner posts, a horizontal rod mounted between the corner posts on one side of the frame, a horizontal winding roller journaled between the corner posts on the other side of the frame, girth straps fastened to the roller and having means for detachably connecting the same to said rod, a brace connecting the upper ends of the front corner posts, and a pair of head-stock straps attached to and depending from the brace and fastened at their lower ends to the front girth strap.

2. In a horseshoeing stall, a frame having corner posts, a horizontal rod mounted between the corner posts on one side of the frame, a horizontal winding roller journaled between the corner posts on the other side of the frame, girth straps fastened to the roller and having means for detachably connecting the same to said rod, a brace connecting the upper ends of the front corner posts, a pair of head-stock straps attached to and depending from the brace and fastened at their lower ends of the front girth strap, and means to adjust the length of said head-stock straps.

3. In a horseshoeing stall, a frame having corner posts, a horizontal rod mounted between the corner posts on one side of the frame, a horizontal winding roller journaled between the corner posts on the other side of the frame, girth straps fastened to the roller and having means for detachably connecting the same to said rod, a brace connecting the upper ends of the front corner posts, a pair of head-stock straps attached to and depending from the brace and fastened at their lower ends of the front girth strap, and longitudinal straps slidably connected at their ends to the girth straps for relative lateral adjustment.

4. In a horseshoeing stall, a frame having corner posts, a horizontal rod mounted between the corner posts on one side of the frame, a horizontal winding roller journaled between the corner posts on the other side of the frame, girth straps fastened to the roller and having means for detachably connecting the same to said rod, a brace connecting the upper ends of the front corner posts, a pair of head-stock straps attached to and depending from the brace and fastened at their lower ends to the front girth strap, said roller having a forwardly projecting operating shaft, an operating handle, and a worm gearing between the operating shaft of the roller and said handle.

5. In a horseshoeing stall, a frame having corner posts, a horizontal rod mounted between the corner posts on one side of the frame, a horizontal winding roller journaled between the corner posts on the other side of the frame, girth straps fastened to the roller and having means for detachably connecting the same to said rod, a brace connecting the upper ends of the front corner posts, a pair of head-stock straps attached to and depending from the brace and fastened at their lower ends to the front girth strap, and hopple ropes on the corner posts adapted to be tied about the animal's legs.

In testimony whereof I affix my signature.

FRANK J. STEFL.